United States Patent [19]
Ross

[11] Patent Number: 5,561,404
[45] Date of Patent: Oct. 1, 1996

[54] AMPLIFIED SERIAL DIGITAL CABLE EQUALIZER CIRCUIT HAVING A HIGH RETURN LOSS

[75] Inventor: John D. Ross, Iroquois, Canada

[73] Assignee: Ross Video Limited, Iroquois, Canada

[21] Appl. No.: 413,811

[22] Filed: Mar. 28, 1995

[51] Int. Cl.$^6$ .............................. H04B 3/36; H03H 11/00
[52] U.S. Cl. .................. 333/28 R; 375/214; 375/229
[58] Field of Search .................................. 333/18, 28 R; 375/211, 214, 215, 229, 230, 231

[56] References Cited

U.S. PATENT DOCUMENTS

| | | | |
|---|---|---|---|
| 3,560,857 | 2/1971 | Nakahara et al. | 375/214 |
| 4,320,515 | 3/1982 | Burton, Jr. | 375/215 |
| 4,715,049 | 12/1987 | Andrews et al. | 375/211 X |
| 5,280,346 | 1/1994 | Ross | 333/28 R X |

FOREIGN PATENT DOCUMENTS

| | | | |
|---|---|---|---|
| 62-51837 | 3/1987 | Japan | 375/215 |

OTHER PUBLICATIONS

Frame, "Recent Advances in Coaxial Digital Transmission," EASCON '76, Washington, D.C., 26–29 Sep. 1976, pp. 86A–86G.
Gennum Corporation, GenLix™ GS9004A Serial Digital Cable Equalizer Date Sheets Recherches Miranda 41212 Encoder Schematic, Jan. 1994.

*Primary Examiner*—Benny Lee
*Assistant Examiner*—Justin P. Bettendorf
*Attorney, Agent, or Firm*—Sixbey Friedman Leedom & Ferguson; Gerald J. Ferguson, Jr.; Evan R. Smith

[57] ABSTRACT

A wide-band high-frequency analog amplifier is provided in the signal path between an input cable connector and an integrated-circuit based cable equalizer. The amplifier is preferably a common base transistor amplifier. The amplifier serves multiple purposes, including providing additional gain to compensate for losses incurred in the equalizer, increasing return loss on the input line, and allowing different gain levels in the input stage and operating stages of the equalizer.

12 Claims, 4 Drawing Sheets

5,561,404

1

AMPLIFIED SERIAL DIGITAL CABLE EQUALIZER CIRCUIT HAVING A HIGH RETURN LOSS

FIELD OF THE INVENTION

The invention relates generally to an improved interface circuit for transmitting serial digital television signals through long coaxial cables without errors.

BACKGROUND OF THE INVENTION

In the television industry, it is common to transmit video signals in one of several standard digital formats between camera, studio, transmitting, and other equipment. Coaxial cable having nominal 75 Ohm impedance is commonly used to make these connections.

A serial TV signal contains a large amount of very high frequency energy. In the case of component (as opposed to NTSC) transmission, color television waveforms are digitized, usually to 10 bit accuracy, at a rate of 13.5 MHz for the Y (luminance) component and a rate of 6.75 MHz for each of the R-Y and B-Y (color difference) components. When the samples are interleaved as R-Y, Y, B-Y, Y, this results in a final multiplexed 10 bit parallel rate of 27 megabytes per second. Subsequent conversion of the 10-bit data to serial format results in a bit rate of 270 Mb/s. It should be noted that other serial standards exist and currently result in bit rates of 143 Mb/s for NTSC composite, 177 Mb/s for PAL composite and 360 Mb/s for wide-screen component signals.

Coaxial cables of the type commonly used for the transmission of serial digital television signals (such as Belden type 8281) are of high quality, but nevertheless have a large loss at the typical 270 Mb/s transmission rate. At this data rate, the attenuation is approximately 33 dB for 300 meters of cable.

Connecting equipment is considered acceptable by those in the broadcast industry if it can operate fault-free with 300 meters of cable. Unfortunately, practical prior art equipment operating in real-world conditions typically operates fault-free with a maximum cable length of 150 to 250 meters.

Good input return loss, on the order to 20 dB, is desirable because poor return loss causes reflections on the associated coaxial input cable. Such reflections can produce signal cancellation effects, thus rendering the signal unusable, especially with short (e.g. 20 meter) cables. Prior art equipment has a return loss often in the range of 8 dB to 18 dB. Current standards call for a minimum of 15 dB.

In the prior art, interface circuits known as cable equalizers were provided to connect a serial digital input signal to the coaxial cable for video signal transmission. In conventional cable equalizers, the receiving end of the cable is connected to an integrated circuit containing an automatically-adjusted cable response-loss equalizing circuit. The purpose of this circuit is to restore the high-frequency components of the waveform to normal levels. Once the waveform is restored by the equalizer, further processing, usually digital, of the incoming signal can proceed without bit errors created by reflections on the cable. However, the signal processing performed by the cable equalizers results in a loss of signal strength.

FIG. 1 is a functional block diagram of a GENLINX™ GS9004A serial digital cable equalizer integrated circuit manufactured by Gennum Corporation, Burlington, Ontario, Canada. This device, shown generally at 100, is used to equalize video signals from a coaxial cable, and is implemented as a 14 pin chip powered by a single 5 VDC power supply. The chip is capable of operating at up to 400 Mb/sec. A serial digital input signal is connected to input 102 of integrated circuit 100, either differentially or single ended, with the unused input being decoupled. The equalized signal is generated by passing the cable signal through a voltage variable filter 104 having a characteristic which closely matches the inverse cable loss characteristic. Additionally, the variation of the filter characteristic with control voltage is designed to imitate the variation of the inverse cable loss characteristic as the cable length is varied. The amplitude of the equalized signal is monitored by a peak detector circuit 106 which produces an output current with polarity corresponding to the difference between the desired peak signal level and the actual peak signal level. This output is integrated by an external AGC filter capacitor 108, providing a steady control voltage for voltage variable filter 104 through filter control 110.

Signal strength indicator output 112 provides a level proportional to the amount of AGC. As the filter characteristic is varied automatically by the application of negative feedback, the amplitude of the equalized signal is kept at a constant level which represents the original amplitude at the transmitter. The equalized signal is then DC restored by DC restorer 114, which restores the logic threshold of the equalized signal to its correct level irrespective of shifts due to AC coupling.

In the final stage of signal conditioning within the Gennum integrated circuit 100, a comparator 116 converts the analog output of the DC restorer to a regenerated digital output signal having pseudo-ECL voltage levels. An output eye monitor 118 allows verification of signal integrity after equalization, prior to reslicing.

FIG. 2 shows a conventional operational test setup circuit for integrated circuit 100 as disclosed in the Gennum data sheets. As can be seen, the cable bearing the input signal is typically capacitively coupled directly to serial digital input 102 without any intervening processing or amplification circuitry. A 75 ohm resistor ties the input to ground to provide the desired input impedance. The Gennum integrated circuit 100 is used by a number of manufacturers in making serial digital cable equalizing circuits, but as far as the inventor is aware, this circuit has not been used in conjunction with an analog preamplification and input processing circuit. The high frequency impedance of the Gennum circuit has a substantial capacitive component.

FIG. 3 shows another known serial digital cable equalizer circuit, a 41212 encoder manufactured by Recherches Miranda, Inc. This circuit uses an SBX 1602A integrated circuit manufactured by Sony Corporation of Japan. As in the case of the Gennum circuit shown in FIG. 2, the circuit in FIG. 3 has a cable input 302 which is capacitively coupled to the input of the integrated circuit. A resistor R33 is also provided to create the desired input impedance.

The industry has generally accepted that there is an unavoidable tradeoff required between the competing goals of maintaining high signal strength to drive a long cable, and minimizing cable reflections which cause bit errors or "snow" in the picture. Modern television sets and cable television transmission systems are capable of creating a high quality picture, and consumers have become accustomed to receiving pictures without interference or signal errors. While any transmission system may create an occasional error, the occurrence of any significant number of bit errors prior to transmission to the receiving stations is considered unacceptable. Integrated circuits designed for this purpose, such as the Gennum circuit described above with reference to FIGS. 1 and 2, have a variable internal automatic gain control, but the provision of this amplification does not overcome the inherent tradeoff between maintaining high signal strength and minimizing cable reflections.

Prior art efforts to increase return loss (that is, minimize cable reflections) beyond a certain level created a substantial loss of signal amplitude, resulting in a large number of errors with long cables. Thus, circuits of the type shown in FIGS. 1–3 are limited in their ability to drive long cables without introducing substantial error. Amplification of the signal within the digital circuit is ineffective because any existing cable reflection signal components are also inherently amplified, negating potential gains from increasing the return loss on the front end. A less-than-satisfactory compromise was usually made between achieving reasonably good input return loss (15 dB being a minimum target) and error-free overall performance (300 meters minimum with less than 1 error per day).

While not generally recognized as a major source of the problem by those skilled in this art, practical equipment designs (using available integrated circuits to receive the signal) have suffered from certain additional high-frequency losses which reduce performance with long cables. These losses usually arise from the need to be able to plug the circuit boards into some type of chassis-mounted backplane which would in turn provide a mount for coaxial connectors for the incoming cable. For reason of cost, economical connectors are used which are neither of a coaxial nature nor designed to carry signals having such a large high-frequency content. In attempts to correct the resultant impedance discontinuity, additional signal losses are incurred. The effect of this loss is compounded because the available integrated circuit equalizers often have marginal equalization gain performance. The cumulative result is that it has been difficult to achieve satisfactory performance with more than 250 meters of cable in equipment having plug-in circuit boards.

The inventor has discovered through his study of the problem that the error rate begins increasing at a substantial rate when the cable length is extended beyond a certain threshold limit imposed by the capability of the cable equalizer circuit. Typically, with circuits of the type shown in FIGS. 1–3, this threshold occurs with about 250 meters of cable. Near the threshold, adding a small amount of cable length, such as 30 meters, can completely degrade the picture being transmitted. Because of the existence of this threshold effect, and because the threshold point may vary due to temperature and other factors, it is generally desirable to provide an equalizing circuit capable of driving a good deal more cable than is being used, to provide a safety factor.

Thus, there are a number of problems and conflicting requirements facing designers of serial digital equalizing circuits, and there is a need for an improved serial digital equalizing circuit that overcomes the problems and limitations experienced in the prior art.

SUMMARY OF THE INVENTION

Therefore, it is a general object of the present invention to provide an improved serial digital cable equalizer circuit which overcomes the aforementioned problems of prior technology.

A more specific object of the present invention is to provide an improved serial digital cable equalizer circuit having an analog amplifying circuit connected between the video cable input and the digital processing circuits of the cable equalizer.

A further object of the present invention is to provide an improved serial digital cable equalizer circuit which can effectively drive a coaxial cable in excess of 300 meters in length without any errors.

Yet another object of the present invention is to provide an improved serial digital cable equalizer circuit which provides a high return loss, and at the same time provides a high amplitude output.

Another object of the present invention is to provide an improved serial digital cable equalizer circuit which combines analog amplification and digital signal processing sections to effectively allow different gain levels in input and output portions of the circuit.

It is also an object of the present invention to provide an improved serial digital cable equalizer circuit with a common base type analog amplifying circuit connected to buffer the video input signal to the cable equalizer.

A further object of the present invention is to provide an improved serial digital cable equalizer circuit with a video input buffering circuit which isolates the input from impedance and capacitance of digital signal processing chips in the circuit.

Another object of the present invention is to provide an improved serial digital cable equalizer circuit with a current mode signal input to reduce capacitive effects in the video input signal and improve return loss.

It is also an object of the present invention to provide an improved serial digital cable equalizer circuit with an input circuit that minimizes reflections on the connected line, and at the same time amplifies the input signal to provide a high quality input to digital processing portions of the equalizer circuit.

Additional objects of the invention will be apparent to those skilled in the art upon review of the disclosure.

These objects and others are achieved in the present invention by providing a wide-band high-frequency amplifier in the signal path between the input cable connector and the circuit providing the cable equalization. The additional gain provided by the amplifier compensates for the loss incurred due to the physical problems of practical equipment. Further, if the gain is increased beyond the amount needed for such compensation, there is a potential for improved equipment performance with cables even longer than the length specified as the design limit by the equalization circuit manufacturer.

DETAILED DESCRIPTION OF THE PREFERRED EMBODIMENTS

Figure 1:
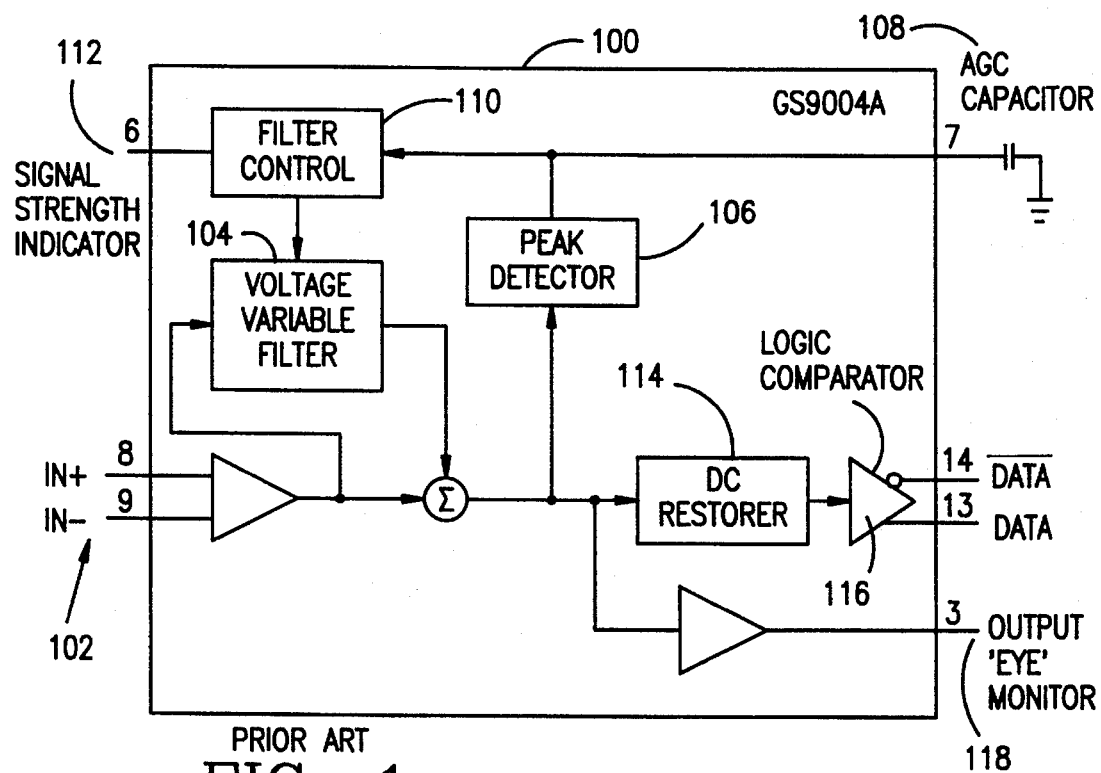
FIG. 1 is a functional block diagram of a conventional serial digital cable equalizer integrated circuit.
Figure 2:
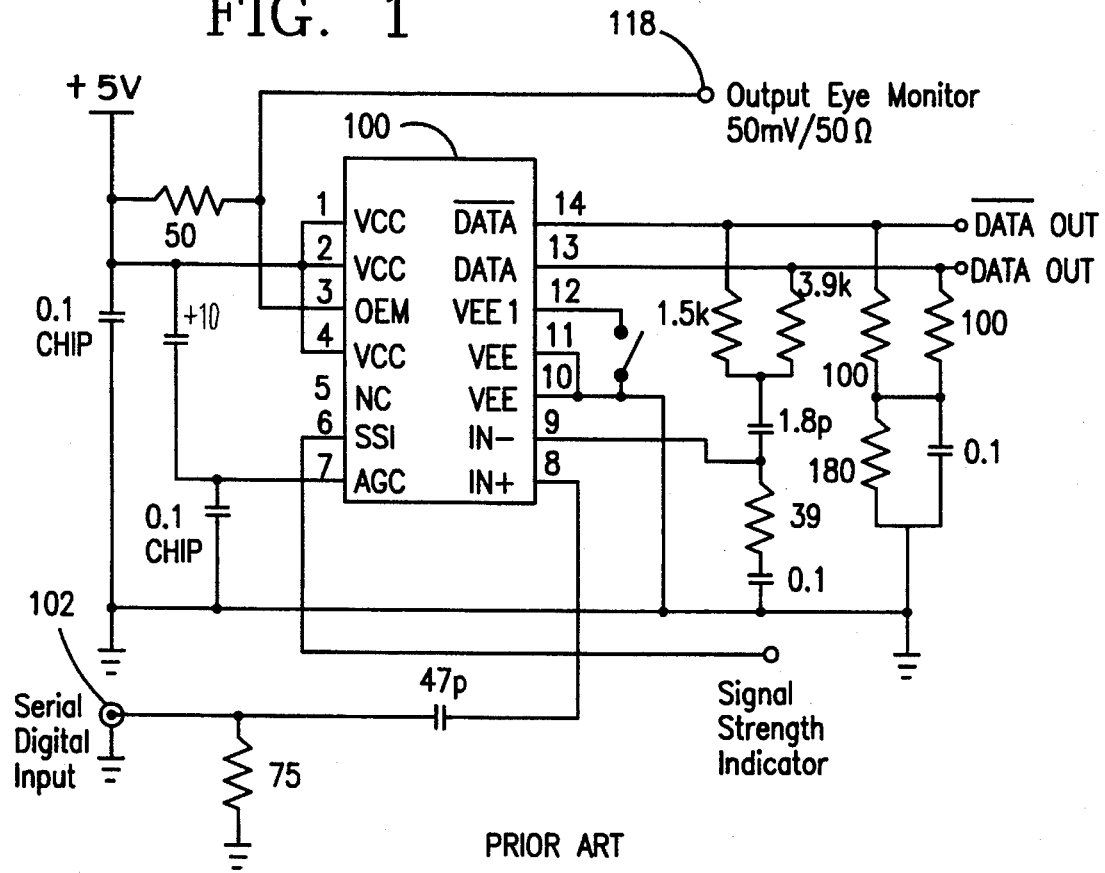
FIG. 2 is a conventional sample circuit setup for testing the integrated circuit referenced in FIG. 1.
Figure 3:
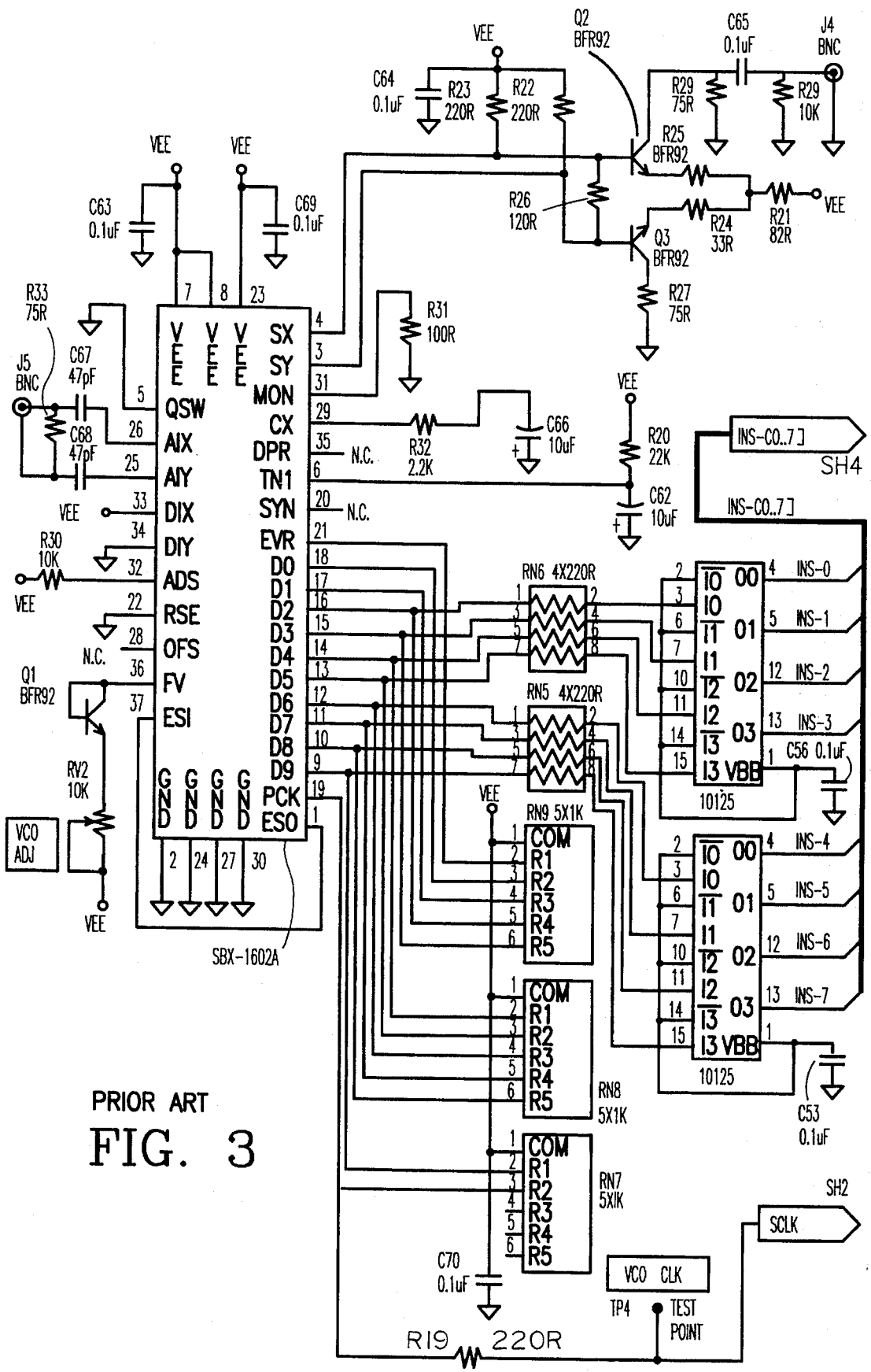
FIG. 3 is a schematic diagram of a prior art cable equalizer circuit incorporating another conventional integrated circuit.
Figure 4:
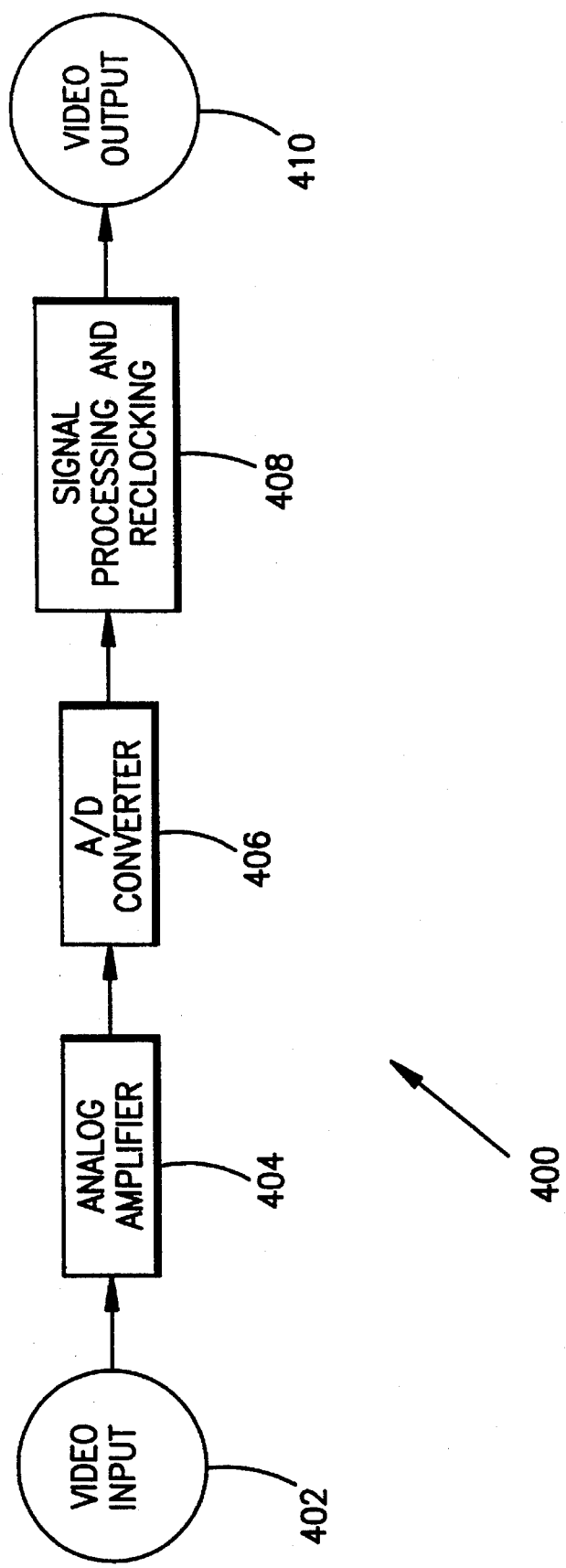
FIG. 4 is a block schematic diagram of a preferred embodiment of a cable equalizing circuit according to the present invention.

A preferred embodiment of the present invention will now be described in detail. FIG. 4 is a block diagram of one embodiment of a cable equalizing circuit according to the present invention, shown generally at 400. Circuit 400 comprises video input 402, analog amplifier 404, A/D converter 406, signal processing and reclocking stage 408, and video output 410. Video input 402 is connected to receive a digital video signal to be transmitted over a long coaxial cable. Video input 402 is connected to the input of analog amplifier 404. Analog amplifier 404 is preferably a common base transistor amplifier circuit which provides gain of, for example, 2.5 in the amplitude of the digital video signal connected to video input 402. From the output of analog amplifier 404, the signal is transmitted to the input of A/D converter 406 which shapes and equalizes the input signal.

Signal processing and reclocking stage 408 receives the output of A/D converter 406 and processes the signal to remove noise, jitter, and to establish desired timing and rise times in the digital output. Signal processing and reclocking stage 408 includes a phase locked loop which samples the incoming signal and locks to the input signal frequency. The phase locked loop circuit is then used to establish uniform clocking of the signal as it is processed, to produce a consistent output signal. The output of signal processing and reclocking stage 408 is connected to video output 410 which amplifies the reclocked signal, providing increased fanout capacity, and physically connects the signal to drive a cable or cables.

Figure 5:
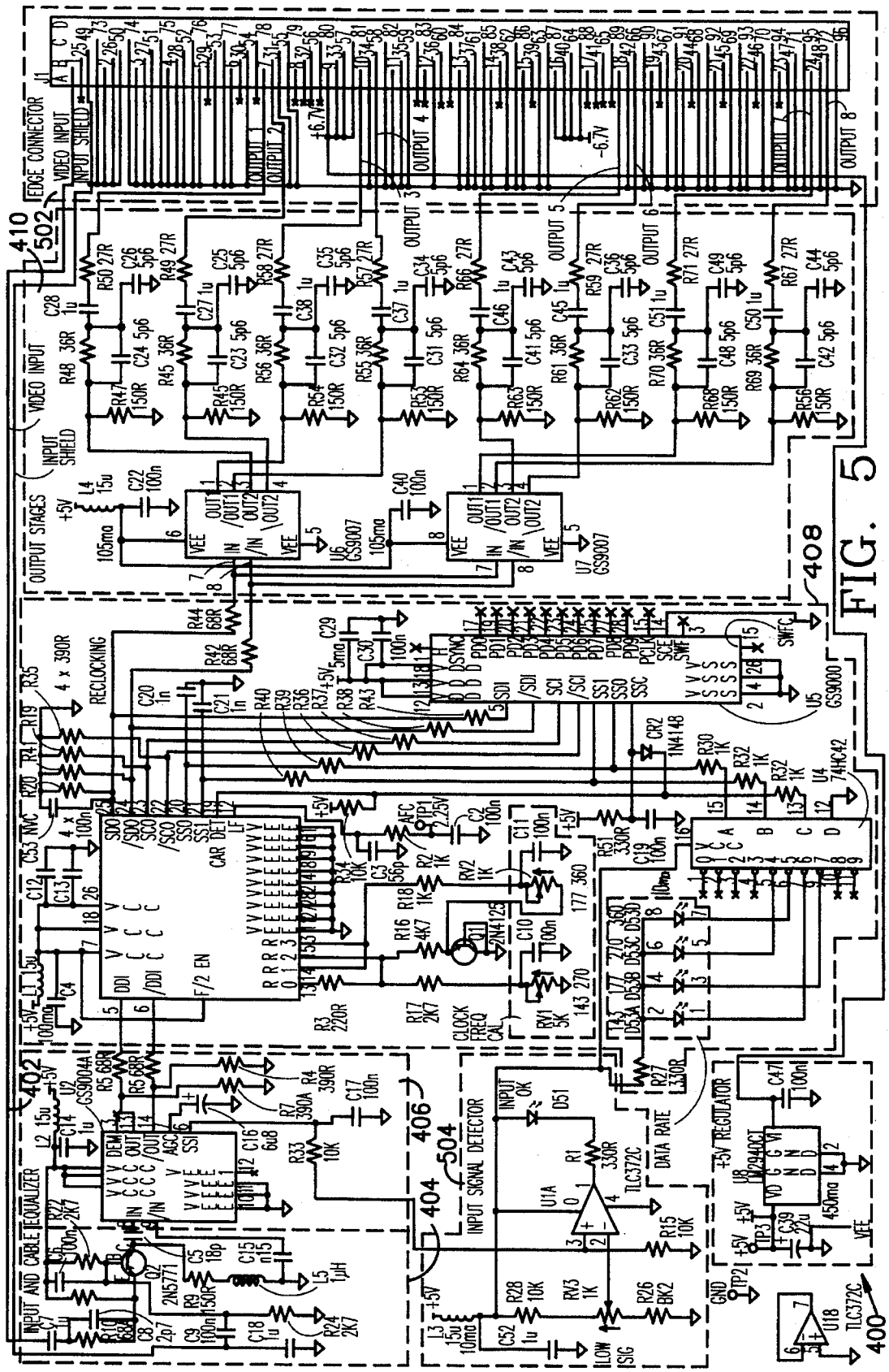
FIG. 5 is a more detailed schematic diagram of the cable equalizing circuit of FIG. 4.

FIG. 5 is a more detailed schematic of the circuit shown generally in the block diagram of FIG. 4. FIG. 5 shows the circuit 400 comprising video input 402, analog amplifier 404, A/D converter 406, signal processing and reclocking stage 408, and video output 410.

Amplifier 404 comprises transistor Q2, capacitors C5, C6, C7, C8, C9, C15, and C18, resistors R9, R10, R22, and R24, and inductor L5. Amplifier 404 is placed on a circuit board holding circuit 400 in a position very close to edge connector 502 to help increase return loss. Resistor R10 and Capacitor C8 provide a terminating impedance (nominally 75 ohms) for input 402 since the emitter of transistor Q2 has a low impedance for signal input. Capacitor C8 also increases the high frequency gain of amplifier 404 by reducing impedance at high frequencies where the inductance of the wire has a significant effect.

Inductor L5 is preferably formed as an extended trace on the circuit board rather than as a discrete component. This inductor helps control the impedance of the collector of transistor Q2 to ground. Without the inductor, capacitance in the circuit would be parallel with resistor R9 and gain of the amplifier would fall off over 200 Mhz as the capacitive effect increased. Inductor L5 causes impedance to rise at high frequencies, countering this effect.

Capacitor C7 is a coupling capacitor that prevents voltages on the emitter of Q2 from being transmitted back over the cable connected to input 402.

Amplifier transistor Q2 is operated in common-base mode with input applied to the emitter from J1 via C7, R10 and C8. Q2 has a current gain approximately equal to 1, but the amplification of amplifier 404 is approximately 2.5. The output is taken from the collector via C5 to the equalizer circuit U2. Care has been taken to provide proper bypassing and decoupling. Common base amplifiers offer good isolation between input and output circuits thus are usually very stable, a distinct advantage. Other implementations employing alternative amplifier circuits are also possible. However, designs using integrated circuit amplifiers cost considerably more than the simple, effective circuit shown in FIG. 5, so this circuit is the preferred embodiment of the invention. The base of Q2 is grounded to provide shielding between the sides of the transistor, helping to prevent oscillations and instabilities.

A/D converter 406 makes use of a Gennum integrated circuit GS9004A designated U2 in FIG. 5. This circuit shapes and equalizes the input signal and provides an output in digital form to signal processing and reclocking stage 408.

In signal processing and reclocking stage 408, integrated circuit U3 (Gennum GS9015A) receives the signal from A/D converter 406 and removes noise, jitter, and corrects rise time deficiencies. Circuit U3 includes a phase locked loop oscillator which samples the incoming signal and locks to the input frequency, which may be, for example, 143 Mb/s, 177 Mb/s, 270 Mb/s, or 360 Mb/s with 270 Mb/s being the most common. Integrated circuit U5 is a serial to 10 bit parallel converter which works with integrated circuit U3 to cycle the U3 oscillator so that the oscillator matches and locks to the input frequency. Lines SS0 and SS1 provide a binary selection of one of four possible frequencies, 143, 177, 270, and 360 Mhz. Integrated circuit U4 is a digital decoder, and is connected to SS0 and SS1 to light an appropriate one of four LED indicators DS3A through DS3D to indicate the received data rate.

Input signal detection section 504 has a comparator U1A which compares an output signal from integrated circuit U2 in A/D converter 406 with a reference voltage. If input is absent, there is no indication. If the input signal has enough power, an LED DS1 lights to indicate "input okay."

Output 410 comprises integrated circuits U6 and U7 which amplify the reclocked signal to drive a cable or cables. The circuit is provide with a total driving capacity of 8 outputs. The output impedance of the circuit is 75 ohms over the full frequency band used by the four supported video standards. Resistor and capacitor networks are provided for each output to slow down and shape the rise time output of integrated circuits U6 and U7, and also to provide the desired 75 ohm output impedance.

Prior art circuits do not employ an analog input amplifier stage (amplifier 404) and thus suffer from an inability to terminate the input cable properly and at the same time deliver maximum signal to the equalizer circuit. As noted above, in the prior art a less-than-satisfactory compromise was usually made between achieving good input return loss (15 dB being a minimum target) and error-free overall performance (300 meters minimum target with less than 1 error per day). The inventor has found that the provision of common base analog amplifier 404 eliminates the need for a tradeoff and makes it possible to achieve both operational goals at the same time. Amplifier 404 makes it possible to address the problems of input termination and signal level delivered to the equalizer separately. That is, the provision of amplifier 404 makes it possible for the circuit to have gain at the input to A/D converter 406 which is different from the gain in the signal processing and reclocking stage 408. This feature of the circuit eliminates the need for the tradeoff experienced in prior art circuits.

Further, common base amplifiers have a low input impedance and this makes it easier to terminate the incoming 75 ohm cable signal circuit while recovering maximum signal current. Amplifier 404, due to its current-mode operation and its location between the input and the integrated circuit used in A/D converter 406, isolates the impedance and capacitance of A/D converter 406 from the input line, which significantly improves return loss characteristics. The circuit shown in FIG. 5 has a flat return loss characteristic to 400 Mhz.

With the common base amplifier, the emitter has a low impedance for signal input but this amplifier has the advantage of being current driven. The inventor has found that it is easier to control return loss with a current driven amplifier. Since it is current, and not voltage, that is important within the amplification stage, capacitance to ground becomes unimportant. This amplifier will operate without oscillation or instability under a variety of conditions because a current rather than a voltage signal is present between R10 and Q2 as shown in FIG. 5.

The amplifier circuit shown in FIG. 5 also has the advantage of isolating the impedance and capacitance of integrated circuit U2 from input 402. This isolation contributes to the superior return loss performance of the circuit.

The gain provided by the circuit can be controlled by designing the output circuit for an appropriate impedance over the desired frequency band, because such amplifiers have a current gain just below unity. The embodiment of the invention shown in FIG. 5 provides a gain of about 6 dB over a band extending from 5 MHz to 400 MHz. The addition of amplifier 404 effectively improved the fault-free performance of the equipment to 330 meters from about 250 meters while achieving an exceptionally good input return loss of 25 dB.

I claim:

1. A serial digital cable equalization circuit for use with a coaxial cable comprising:

input means for connecting an input video signal from the coaxial cable to the circuit;

a video cable equalizing circuit, including an analog-to-digital converter and an integrated circuit comprising a variable filter which processes digital video signals to compensate for loss characteristics of the coaxial cable, for digitally processing and reclocking the input video signal and generating a digital video output signal for driving another cable; and an analog amplifier circuit connected between the input means and the video cable equalizing circuit to increase the amplitude of the input video signal provided to the video cable equalizing circuit, such that the amplifier circuit electrically isolates the input means from reflections produced by the video cable equalizing circuit.

2. The circuit of claim 1 wherein the gain level of the analog amplifier circuit is approximately 2.5.

3. The circuit of claim 1 wherein said integrated circuit includes one or more digital signal processing chips and the analog amplifier circuit isolates the input means from impedance and capacitance of said digital signal processing chips.

4. The circuit of claim 1 wherein input to the analog amplifier circuit is provided in current mode, whereby capacitive effects are reduced and return loss is improved.

5. A serial digital cable equalization circuit for use with a coaxial cable, comprising:

input means for connecting an input video signal from the coaxial cable to the circuit;

a video cable equalizing circuit, including an analog-to-digital converter and an integrated circuit comprising a variable filter which processes digital video signals to compensate for loss characteristics of the coaxial cable, for digitally processing the input video signal and generating a digital video output signal for driving another cable; and analog amplifier means connected between the input means and the video cable equalizing circuit for amplifying the input signal and for simultaneously impeding transmission to the input means of signal reflections produced by the video cable equalizing circuit, said analog amplifier circuit having a first gain at a first frequency and a second, greater gain at a second frequency higher than the first frequency to compensate for inductance of said coaxial cable.

6. The circuit of claim 5 wherein the gain level of the analog amplifier means is approximately 2.5.

7. The circuit of claim 5 wherein the signal processing means comprises digital signal processing chips and the analog amplifier means isolates the input means from impedance and capacitance of said digital signal processing chips in the signal processing means.

8. The circuit of claim 5 wherein input to the analog amplifier means is in current mode, whereby capacitive effects are reduced and return loss is improved.

9. A serial digital cable equalization circuit for use with a coaxial cable, comprising:

input means for connecting an input video signal from the coaxial cable to the circuit;

a video cable equalizing circuit, including an analog-to-digital converter and an integrated circuit comprising a variable filter which processes digital video signals to compensate for loss characteristics of the coaxial cable, for digitally processing the input video signal and generating a digital video output signal for driving another cable; and amplifier circuit means comprising a common base transistor amplifier connected between the input means and the video cable equalizing circuit for amplifying the input video signal provided to the video cable equalizing circuit and inhibiting transmission to the input means of reflections produced by the video cable equalizing circuit.

10. The circuit of claim 9 wherein the gain level of the analog amplifier means is approximately 2.5.

11. The circuit of claim 9 wherein the signal processing means comprises digital signal processing chips and the amplifier means isolates the input means from impedance and capacitance of said digital signal processing chips in the signal processing means.

12. The circuit of claim 9 wherein input to the amplifier means is in current mode, whereby capacitive effects are reduced and return loss is improved.

* * * * *